Patented Jan. 13, 1953

2,625,462

UNITED STATES PATENT OFFICE 2,625,462

PROCESSES FOR PRODUCING MANGANESE CARBONATE

Abraham L. Fox, Washington, D. C., assignor to
Reginald S. Dean, Washington, D. C.

No Drawing. Application December 16, 1948,
Serial No. 65,721

5 Claims. (Cl. 23—61)

This invention relates to processes for producing manganese carbonate. It relates particularly to the production of crystalline manganese carbonate by a cyclic process from manganese ores. It has for its aim the recovery of pure manganese carbonate from ores by a simple and inexpensive process.

It has been found that manganous oxide is readily dissolved by an aqueous solution of ammonia and an ammonium salt of an acid forming a soluble manganese salt, within certain concentration ranges: preferably, the leaching solution is one which is substantially saturated with ammonia. If such complex solutions are treated with carbon dioxide, a complex carbamate is formed which on heating or dilution is transformed to carbonate with consequent precipitation of manganese carbonate. If the soluble salt used in the first instance is ammonium carbamate, the step of treating with $CO_2$ prior to precipitation of manganese carbonate is unnecessary.

All ammonia which is driven off in the heating process must be replaced, along with the $CO_2$ removed by the manganese carbonate precipitation, in order to regenerate the solution for re-use in dissolving more manganous oxide. I have found that the precipitation of manganese carbonate may be effectively carried out in closed vessels at practical temperatures and pressures. Since under these conditions no ammonia is driven off, it is only necessary to replace the $CO_2$ to regenerate the solution. Further, the time of heating to bring about a given amount of precipitation is substantially decreased by heating under pressure. There is, therefore, a considerable saving in time in carrying out the cyclic process.

In the following table (Table I) I have shown the relationship between the manganese remaining in solution and time at several temperatures.

*Table I*

| Time (Hours) | Temperature | | | |
|---|---|---|---|---|
| | 50 | 75 | 90 | 120 |
| | Grams per liter remaining | | | |
| 0 | 37.1 | 39.0 | 39.0 | 39.0 |
| ½ | 35.4 | 18.4 | 14.0 | 6.0 |
| 1 | 34.5 | 11.8 | 2.1 | 1.6 |
| 2 | 32.4 | 8.6 | | |
| 3 | 29.9 | 6.0 | | |
| 4 | 27.4 | 4.7 | | |
| 5 | 25.9 | 3.9 | | |
| 6 | 24.4 | 3.5 | | |

It will be clear from this table that 90% of the manganese can be precipitated from solution as carbonate in one hour at 90° C. Preferably, the precipitation operation is so conducted that at least 80% of the manganese is precipitated as $MnCO_3$. The data in the table is for a solution containing 37.1 grams Mn, 280 grams $NH_3$ and 52 grams $CO_2$ per liter made by dissolving the manganous oxide from a reduced manganese ore in a solution containing 280 grams $NH_3$ per liter and 52 grams of $CO_2$ per liter. This solution at ordinary temperatures contains substantially all of the $CO_2$ in the form of carbamate.

If the solution containing the complex manganese ammonium carbamate is diluted by one-half with water, precipitation of manganese carbonate at room temperature is quite incomplete. By heating under pressure, however, manganese carbonate can be precipitated as from the stronger solution. In the following table (Table II) I have shown the relationship between the manganese remaining in this solution and time at the same series of temperatures represented for the stronger solution in the previous table.

*Table II*

| Time (Hours) | Temperature | | | |
|---|---|---|---|---|
| | 50 | 75 | 90 | 120 |
| | Mn remaining in solution, g./l. | | | |
| 0 | 28.0 | 24.0 | 24.0 | 24.0 |
| ½ | 24.0 | 7.2 | 5.4 | 4.9 |
| 1 | 20.7 | 4.8 | 2.7 | 1.2 |
| 2 | 14.0 | 3.4 | | |
| 3 | 9.7 | 2.8 | | |
| 4 | 5.7 | 2.5 | | |
| 5 | 4.6 | 2.3 | | |
| 6 | 4.0 | 2.1 | | |

Examination of this table in comparison with Table I shows that precipitation is more rapid at any given temperature in the weaker solution. Significant improvement in ease of precipitation attends dilution of the solution to such an extent that its manganese content is reduced by at least 5 grams per liter.

The manganese carbonate produced from the several experiments illustrated in the two tables is all crystalline having a rhodocrosite structure as revealed by X-ray spectrometry. There is, however, a marked difference in crystal size as determined by electron microscopy. This difference is shown in the following table:

*Table III*

| Solution | Temperature | Microns, Average Diameter |
|---|---|---|
| Concentrated | 50 | 2.0 |
| | 75 | 3.2 |
| | 90 | 4.5 |
| Dilute | 50 | 0.25 |
| | 75 | 0.75 |
| | 90 | 1.0 |

I have found that the manganese carbonate precipitated under pressure in accordance with the foregoing is readily separated from the solution and that in the case of the concentrated solution this can be regenerated for re-use in dissolving manganous oxide simply by adding $CO_2$. This is preferably done under pressure as in the usual carbonation procedure for making soda-water.

In the case of solutions which have been diluted before precipitation of the manganese carbonate, the solution can be regenerated by adding ammonium carbonate either directly or as ammonia and $CO_2$. This procedure, of course, increases the total volume of leach solution and if this exceeds the drag out by the precipitate, then evaporation of some of the solution with recovery of ammonia and $CO_2$ is necessary.

The preparation of the complex carbamate solution from MnO may be advantageously done in a counter-current fashion. In this way a high manganese content of the solution can be combined with a complete utilization of the MnO. In such a procedure the final solution is treated with an excess of MnO and the partially leached MnO then completely leached with new solution. In this way solutions containing up to 75 grams per liter of manganese can be prepared.

The following examples are given as illustrative of the method of my invention:

Example I

I take 100 grams of manganese dioxide ore which has been reduced at 1500° F. in hydrogen. I treat this with one liter of a solution containing 280 grams of $NH_3$ and 52 grams of $CO_2$ and agitate for two hours at room temperature and filter. The solution contains 50 grams per liter of manganese. I heat this solution in a closed vessel at 90° C. for one hour and filter the precipitated manganese carbonate. The recovered solution contains 1.4 grams of Mn per liter, 548 grams of $NH_4OH$ and 30 grams of $(NH_4)_2CO_3$. I now add $CO_2$ under pressure to restore the original composition of the solution and use it to leach another batch of 100 grams of reduced manganese ores.

Example II

I take 100 grams of manganous oxide and dissolve it in a liter of solution containing 460 grams of $NH_4OH$ and 100 grams of $NH_4Cl$ by agitation at room temperature. I pass enough $CO_2$ into this solution to combine with the amount of manganese in solution. I then heat this solution in a closed vessel to 90° C. for one hour. The manganese is 90% precipitated as carbonate. After removal of the precipitate it is ready for reuse in dissolving more manganous oxide in the first step.

Example III

I take 100 grams of manganese dioxide ore which has been reduced to form MnO of substantially all the manganese. I treat this with one liter of a solution containing 585 grams of $NH_4OH$ and 50 grams of $CO_2$ and agitate for two hours at room temperature with 0.2 gram sodium sulphide. The solution is separated from the residue and diluted to a concentration of 25 grams of Mn per liter. This diluted solution is heated in a closed vessel to 50° C. for five hours. The manganese is 80% precipitated as carbonate. The carbonate is separated from the solution and the solution evaporated to approximately half its volume with provision for recovering $CO_2$ and $NH_3$ evolved. This reduced volume of solution is treated with $NH_3$ and $CO_2$ to bring it up to the original concentration and is re-used to dissolve a fresh batch of reduced manganese ore.

Example IV

I take 200 grams of MnO and heat it with a liter of solution containing 300 grams of $NH_3$, 55 grams of $CO_2$ and 50 grams of manganese from a previous leach like that of Example I. I add 0.2 gram per liter of sodium sulphide and agitate for four hours. The resulting solution contains 75 grams per liter of manganese. The residual MnO is completely leached with fresh solution with the addition of 0.2 gram of sodium sulphide and the residue discarded. The solution so obtained is ready for use in the first step of the present example. The solution containing 75 grams per liter of manganese is heated in a sealed container to 120° C. for one hour. The solution after carbonate precipitation contained 0.8 gram of manganese per liter, 560 grams $NH_4OH$ and 31 grams $(NH_4)_2CO_3$. I now add $CO_2$ under pressure to restore the original composition of the solution and it is ready for leaching the MnO residue from step one.

The invention residing in the use of a small amount of sodium sulphide in the leaching solution, included in Examples III and IV above, is the joint invention of Reginald S. Dean and applicant and is described and claimed in their co-pending application Serial No. 115,122, filed September 10, 1949.

What is claimed is:

1. Process of making manganese carbonate which comprises preparing a solution, free from solid phase, of manganous oxide in an aqueous solution of at least 200 grams per liter of $NH_3$ and an ammonium salt of an acid forming a soluble manganese salt, said manganese-containing solution containing combined carbon dioxide in an amount at least chemically equivalent to the manganese content of such solution but insufficient to form a precipitate, heating said manganese-containing solution under its own vapor pressure at 50–120° C. in a closed vessel for a substantial period to precipitate manganese carbonate, separating the resulting precipitate from the resulting solution of $NH_3$ and ammonium salt, and reusing said resulting solution in preparing a further batch of said manganese-containing solution.

2. Process in accordance with claim 1, in which the ammonium salt consists essentially of ammonium carbamate and in which said resulting solution is regenerated for reuse by dissolving $CO_2$ therein in an amount sufficient to replace that removed in the manganese carbonate precipitate.

3. Process in accordance with claim 1, in which the ammonium salt is a salt of an acid, other than carbamic acid, forming a soluble manganese salt, and in which the manganese-containing solution is carbonated prior to the heating step by dissolving therein carbon dioxide in an amount stoichiometrically equivalent to the manganese content of said manganese-containing solution.

4. Process in accordance with claim 1, in which prior to the heating step the manganese-containing solution is diluted so as to reduce its manganese content by at least 5 grams per liter.

5. The cyclic process of recovering crystalline manganese carbonate from manganous oxide which consists in the steps of dissolving the manganous oxide at atmospheric temperature in a solution of ammonium carbamate substantially saturated with ammonia to form a solution containing at least 25 grams per liter of manganese, separating the solution from any residue, heating the solution under its own vapor pressure at a temperature from 50–120° C. whereby to precipitate at least 80% of the manganese as carbonate, separating the manganese carbonate from the resulting solution, adding $CO_2$ to said resulting solution to restore its original composition and using the regenerated solution to leach a new batch of manganous oxide.

ABRAHAM L. FOX.

REFERENCES CITED

The following references are of record in the file of this patent:

UNITED STATES PATENTS

| Number | Name | Date |
| --- | --- | --- |
| 854,453 | Blass | May 21, 1907 |
| 1,589,644 | Hedenberg | June 22, 1926 |
| 1,889,021 | Kobe | Nov. 29, 1932 |
| 1,909,757 | Coxon | May 16, 1933 |
| 1,980,691 | Mac Mullin | Nov. 13, 1934 |

OTHER REFERENCES

"Inorganic and Theoretical Chemistry," by J. S. Mellor, pages 792 and 798, vol. II, 1922 ed., Longmans, Green & Co., New York, publishers.